US007352990B2

(12) United States Patent
Ikezawa et al.

(10) Patent No.: US 7,352,990 B2
(45) Date of Patent: Apr. 1, 2008

(54) EDUCATION SUPPORT SYSTEM, TARGET PRESENTATION METHOD, RECORDING MEDIUM, AND CARRIER WAVE

(75) Inventors: Toyoji Ikezawa, Kanagawa (JP); Masao Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1194 days.

(21) Appl. No.: 09/956,119

(22) Filed: Sep. 20, 2001

(65) Prior Publication Data

US 2002/0034719 A1 Mar. 21, 2002

(30) Foreign Application Priority Data

Sep. 20, 2000 (JP) ............................. 2000-285618

(51) Int. Cl.
*G09B 3/00* (2006.01)
(52) U.S. Cl. ...................................... 434/350; 434/323
(58) Field of Classification Search ................ 434/350, 434/362, 322, 238, 323, 118, 365
See application file for complete search history.

(56) References Cited

U.S. PATENT DOCUMENTS

| 5,618,182 | A  | * | 4/1997 | Thomas ................... 434/323 X |
| 5,716,273 | A  | * | 2/1998 | Yuen ........................ 463/29 X |
| 5,907,831 | A  | * | 5/1999 | Lotvin et al. .............. 705/14 X |
| 5,954,510 | A  | * | 9/1999 | Merrill et al. ........... 434/236 X |
| 6,224,485 | B1 | * | 5/2001 | Dickinson et al. ......... 463/30 X |
| 6,341,959 | B1 | * | 1/2002 | Wen et al. ............... 434/169 X |
| 6,353,447 | B1 | * | 3/2002 | Truluck et al. .......... 345/733 X |
| 6,447,299 | B1 | * | 9/2002 | Boon ....................... 434/156 X |
| 6,507,726 | B1 | * | 1/2003 | Atkinson et al. ........ 434/350 X |
| 2002/0039722 | A1 | * | 4/2002 | Lippman ................... 434/322 |
| 2002/0052860 | A1 | * | 5/2002 | Geshwind ................. 706/62 X |
| 2002/0076677 | A1 | * | 6/2002 | Wasowicz et al. .......... 434/178 |
| 2002/0182571 | A1 | * | 12/2002 | McCormick et al. ....... 434/157 |
| 2003/0129576 | A1 | * | 7/2003 | Wood et al. ................ 434/362 |

FOREIGN PATENT DOCUMENTS

| JP | 05-281899 | 10/1993 |
| JP | 08-160849 | 6/1996 |
| JP | 08-179682 | 7/1996 |
| JP | 11-282826 | 10/1999 |

OTHER PUBLICATIONS

Zimmerman, Barry J. "A Social-Cognitive View of Self-Regulated Academic Learning." Journal of Educational Psychology, Sep. 1, 1989. vol. 81, Issue 3.*

* cited by examiner

*Primary Examiner*—Robert E. Pezzuto
(74) *Attorney, Agent, or Firm*—Oblon, Spivak, McClelland, Maier & Neustadt, P.C.

(57) ABSTRACT

An education support server generates test data representing a test using a test management database. At this time, the education support server derives a target score for a user who is to take the test represented by the generated test data in accordance with achievement data representing the user's past achievements stored in an achievement management database. The education support server 2 transmits target data including the target score together with the test data to a user terminal. When receiving the target data and the test data transmitted from the education support server, the user terminal displays the content of the test together with the target score the user should aim for, on a display section. When receiving answer data, the user terminal transmits the answer data to the education support server. And when receiving a marking result, the user terminal displays the marking result on the display section.

10 Claims, 6 Drawing Sheets

| USER ID | TEST ID | DATE OF TESTING | SCORE | FIELD OF BASICS | FIELD OF COMMUNICATIONS | FIELD OF IMAGES |
|---|---|---|---|---|---|---|
| 01A0 1234 | 1999q3PRN1 | 1999/8/15 | 65 POINTS | 60% | 70% | 33% |
| | 1999q4CPY2 | 1999/12/3 | 70 POINTS | 62% | — | 90% |
| | 2000q1FAX1 | 2000/1/25 | 75 POINTS | 68% | 80% | 70% |
| | ... | ... | ... | ... | ... | ... |

| NUMBER | FIELD | QUESTION | CHOICES | CORRECT ANSWER |
|---|---|---|---|---|
| 01 | FIELD OF BASICS | WHICH IS THE CORRECT CHARACTERISTIC OF THE COLOR PRINTER**28? | A. MAXIMUM SUPPLY OF SHEETS IS 1400 SHEETS<br>B. CAPABLE OF CONTINUOUSLY COPYING 26 SHEETS/MIN.<br>C. A COPIER-BASED APPARATUS<br>D. FIXED COPYING MAGNIFICATION IS 3R2E | C |
| 02 | FIELD OF IMAGES | WHICH IS THE CORRECT RESOLUTION OF THE PRINTER UNIT ## 40? | A. APPROX. 4800DPIx600DPI<br>B. APPROX. 2400DPIx600DPI<br>C. APPROX. 1200DPIx600DPI<br>D. APPROX. 1200DPIx300DPI | A |
| ... | ... | ... | ... | ... |

TEST ID 2000q 2PRN3

URL: http:// # # #.co.jp/question/200000102.html

CHECK YOUR UNDERSTANDING OF NEW PRODUCTS

YOUR TARGET SCORE IS [TEST] [80 POINTS]

CHECK YOUR UNDERSTANDING OF COLOR PRINTER✽✽28

Q1: WHICH IS THE CORRECT CHARACTERISTIC OF THE COLOR PRINTER✽✽28?

☐ MAXIMUM SUPPLY OF SHEETS IS 1400 SHEETS
☐ CAPABLE OF CONTINUOUSLY COPYING 26 SHEETS/MIN.
☑ A COPIER-BASED APPARATUS
☐ FIXED COPYING MAGNIFICATION IS 3R2E

Q2: WHICH IS THE CORRECT RESOLUTION OF THE PRINTER UNIT &&40?

FIG. 7b

URL: http:// # # #.co.jp/result.html

CHECK YOUR UNDERSTANDING OF NEW PRODUCTS

[MARKING RESULT]

CHECK YOUR UNDERSTANDING OF COLOR PRINTER✽✽28

| YOUR SCORE | 82 POINTS | /100 POINTS |

[CORRECT ANSWERS]

Q1: WHICH IS THE CORRECT CHARACTERISTIC OF THE COLOR PRINTER✽✽28?

☐ MAXIMUM SUPPLY OF SHEETS IS 1400 SHEETS
☐ CAPABLE OF CONTINUOUSLY COPYING 26 SHEETS/MIN.
■ A COPIER-BASED APPARATUS
☐ FIXED COPYING MAGNIFICATION IS 3R2E

EDUCATION SUPPORT SYSTEM, TARGET PRESENTATION METHOD, RECORDING MEDIUM, AND CARRIER WAVE

CROSS-REFERENCE TO RELATED APPLICATIONS

This application is based on Japanese Patent Application No. 2000-285618 filed on Sep. 20, 2000, the entire contents of which are hereby incorporated herein by reference.

BACKGROUND OF THE INVENTION

1. Field of the Invention

The present invention relates to an education support system via a network which can reduce the burden of learning imposed on a learner of an educational course. More particularly, the present invention relates to an education support system and a target presentation method that can appropriately improve a learner's motivation to take a course, and a recording medium and a carrier wave used in the system and method.

2. Description of the Related Art

Conventionally, companies and schools have employed an education method in which an instructor collectively educates a lot of learners gathered in one place, and afterwards, tests the learners using questions prepared for training to see how well the learners understand the lectures.

Companies selling various office apparati also employ such the education method in order to improve salespersons' (sales managers') understanding of products.

More specifically, when a maker whom those companies have dealings with releases a new product, sales promotion managers of those companies gather salespersons employed in their companies in one place, and give a lecture about features and specs of the new product to the salespersons altogether. Then, the sales promotion managers examine the salespersons using training questions they prepared themselves, and check the understanding of each of the salespersons.

However, this education method contains problems such as that a cost is required for each salesperson for going to the place where the class is to be held, and that someone might not be able to attend the class because of limitations of time and distance.

Specifically, the above companies have to pay the transportation expense of each of their salespersons. Therefore, reduction in such travelling costs has been required in companies employing a lot of salespersons. And in some cases, some salespersons who wish to attend a class have to give up attendance because of limitations on time and distance. And some salespersons, who manage to attend the class, cause troubles in their routine work, from the burden of going to the class spending a lot of time.

On the other hand, the sales promotion managers have to prepare training questions about new products, every time they hold a class. And after the salespersons solve the questions, the managers have to do a lot of accompanying works such as marking the answer sheets, summing up the scores, and the like. Reduction in work costs for those managers work has also been required in those companies.

Further, since those companies generally hold classes or prepare training questions individually, there inevitably occurs unevenness in the content of education. For example, in a company having many subsidiary companies in different areas, salespersons' levels of understanding of products vary from subsidiary to subsidiary.

SUMMARY OF THE INVENTION

It is an object of the present invention to provide an education support system and a target presentation method which can appropriately improve a user's motivation for taking a class while also reducing the user's burden of taking the class, and a recording medium and a carrier wave used in the system and method.

To accomplish the above object, an education support system according to a first aspect of the present invention comprises a user terminal and a support server which are connected with each other via a predetermined network, wherein:

the support server: generates test data which represent a test that a user should take; determines a predetermined target value which corresponds to the generated test data in accordance with achievement data which represent the user's past achievements; and transmits target data including the determined target value together with the generated test data to the user terminal, the user terminal: receives the target data and the test data transmitted from the support server; and displays a content of the test that the user should take together with the target value for which the user should aim in accordance with the received target data and test data.

According to this invention, the support server generates test data representing a test that a user should take in accordance with information stored in, for example, a predetermined test management database, determines a target value (a target score or the like) which corresponds to the generated test data in accordance with achievement data stored in, for example, an achievement management database, and transmits target data including the determined target value together with the generated test data to the user terminal. On the other hand, the user terminal receives the target data and the test data transmitted from the support server, and displays a content of the test that the user should take together with the target value (a target score or the like) for which the user should aim in accordance with the received target data and test data. As described, a user can take a class when it is convenient for him/her using the user terminal which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

To accomplish the above object, an education support system according to a second aspect of the present invention comprises a user terminal and a support server which are connected with each other via a predetermined network, wherein:

the support server comprises:

a test generator which generates test data representing a test that a user should take;

an achievement storage unit which stores achievement data which represent the user's past achievements;

a target determiner which determines a predetermined target value which corresponds to the test data generated by the test generator in accordance with the achievement data stored in the achievement storage unit; and a test transmitter which transmits target data including the target value determined by the target determiner together with the test data generated by the test generator to the user terminal, the user terminal comprises:

a test reception unit which receives the target data and the test data transmitted by the test transmitter; and a display unit which displays a content of the test that the user should take together with the target value for which the user should aim in accordance with the target data and the test data received by the test reception unit.

According to this invention, in the support server, the test generator generates test data representing a test that a user should take in accordance with information stored in, for example, a predetermined test management database. The achievement storage unit comprises, for example, an achievement management database or the like, and stores achievement data representing the user's past achievements. The target determiner determines a target value (a target score or the like) which corresponds to the test data generated by the test generator in accordance with the achievement data stored in the achievement management database. The test transmitter transmits target data including the target value determined by the target determiner together with the test data generated by the test generator to the user terminal. On the other hand, in the user terminal, the test reception unit receives the target data and the test data transmitted from the test transmitter. The display unit displays the target value (a target score or the like) for which the user should aim and the content of the test that the user should take in accordance with the target data and the test data received by the test reception unit. As described, a user can take a class when it is convenient for him/her using the user terminal which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

The user terminal may further comprise:

an answer acquiring unit which acquires the content of an answer to the test displayed on the display unit; and an answer transmitter which transmits answer data which represent the content of the answer acquired by the answer acquiring unit to the support server.

The support server may further comprise:

an answer reception unit which receives the answer data transmitted from the answer transmitter;

a marking unit which derives a marking result and an achievement by judging whether the answer represented by the answer data which the answer reception unit receives is correct in accordance with a predetermined correct answer data;

a score transmitter which transmits score data including the marking result derived by the marking unit to the user terminal; and an achievement data renewal unit which adds achievement data representing the achievement derived by the marking unit to the achievement storage unit in order to store the achievement data in the achievement storage unit.

The test generator may generate test data representing a test having contents which are classified into various fields.

The achievement storage unit may store achievement data including achievement values for the respective fields.

The target determiner may determine a target value which corresponds to the test data generated by the test generator by deriving predetermined expected values for the respective fields included in the test data in accordance with the respective achievement values stored in the achievement storage unit, and by adding up all the expected values.

An education support system according to a third aspect of the present invention comprises a user terminal and a support server which are connected with each other via a predetermined network, wherein:

the support server comprises:

test generation means for generating test data representing a test that a user should take;

achievement storage means for storing achievement data representing the user's past achievements;

target determining means for determining a predetermined target value which corresponds to the test data generated by the test generation means in accordance with the achievement data stored in the achievement storage means; and test transmitting means for transmitting target data including the target value determined by the target determining means together with the test data generated by the test generation means to the user terminal, the user terminal comprises:

test reception means for receiving the target data and the test data transmitted from the test transmitting means; and display means for displaying the content of the test that the user should take together with the target value for which the user should aim in accordance with the target data and the test data received by the test reception means.

According to this invention, in the support server, the test generation means generates test data representing a test that a user should take in accordance with information stored in, for example, a predetermined test management database. The achievement storage means comprises, for example, an achievement management database or the like, and stores achievement data representing the user's past achievements. The target determining means determines a target value (a target score or the like) which corresponds to the test data generated by the test generation means in accordance with the achievement data stored in the achievement management database. The test transmitting means transmits target data including the target value determined by the target determining means together with the test data generated by the test generation means to the user terminal. On the other hand, in the user terminal, the test reception means receives the target data and the test data transmitted from the test transmitting means. The display means displays the target value (a target score or the like) for which the user should aim, and the content of the test that the user should take in accordance with the target data and the test data received by the test reception means. As described, a user can take a class when it is convenient for the user using the user terminal which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

To accomplish the above object, an education support server according to a fourth aspect of the present invention comprises a user terminal and a support server which are connected with each other via a predetermined network, wherein:

the support server: stores achievement data representing past achievements of a user; generates a test data representing a test that the user should take; determines a target score which corresponds to the generated test data in accordance with the stored achievement data; and transmits target data including the determined target score together with the generated test data to the user terminal, the user terminal: receives the target data and the test data transmitted from the support server; displays the content of the test that the user should take together with the target score for which the user should aim in accordance with the received target data and test data; and acquires answer data representing an answer to the displayed content of the test.

According to this invention, the support server stores achievement data representing past achievements of a user in, for example, an achievement management database, generates test data representing a test that the user should take in accordance with data stored in, for example, a predetermined test management database, determines a target score which corresponds to the generated test data in accordance with the achievement data stored in the achievement management database, and transmits target data including the determined target score together with the generated test data, to the user terminal. On the other hand, the user terminal receives the target data and the test data transmitted from the support server, displays the content of the test that the user should take together with the target score for which the user should aim in accordance with the received target data and test data, and acquires answer data representing an answer input by the user. As described, a user can take a class when it is convenient for the user using the user terminal which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

To accomplish the above object, an education support system according to a fifth aspect of the present invention comprises a user terminal and a support server which are connected with each other via a predetermined network, wherein:

the support server comprises:

a test generator which generates test data representing a test that a user should take;

an achievement storage unit which stores achievement data representing the user's past achievements;

a target determiner which determines a target score which corresponds to the test data generated by the test generator in accordance with the achievement data stored in the achievement storage unit; and a test transmitter which transmits target data including the target score determined by the target determiner together with the test data generated by the test generator to the user terminal, the user terminal comprises:

a test reception unit which receives the target data and the test data transmitted from the test transmitter;

a display unit which displays the content of the test that the user should take together with the target score for which the user should aim in accordance with the target data and the test data received by the test reception unit; and an answer acquiring unit which acquires the content of an answer to the test displayed on the display unit.

According to this invention, in the support server, the test generator generates test data representing a test that a user should take in accordance with information stored in, for example, a predetermined test management database. The achievement storage unit comprises, for example, an achievement management database or the like, and stores achievement data representing the user's past achievements. The target determiner determines a target score which corresponds to the test data generated by the test generator in accordance with the achievement data stored in achievement management database. The test transmitter transmits target data including the target score determined by the target determiner together with the test data generated by the test generator to the user terminal. On the other hand, in the user terminal, the test reception unit receives the target data and the test data transmitted from the test transmitter. The display unit displays the content of the test that the user should take together with the target score for which the user should aim in accordance with the target data and the test data received by the test reception unit. Then, the answer acquiring unit acquires the content of an answer to the test input by the user. As described, a user can take a class when it is convenient for the user using this user terminal which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

The user terminal may further comprise an answer transmitter which transmits answer data representing the content of the answer acquired by the answer acquiring unit to the support server.

The support server may further comprise:

an answer reception unit which receives the answer data transmitted from the answer transmitter;

a marking unit which derives a marking result and an achievement by judging whether the answer represented by the answer data which the answer reception unit receives is correct in accordance with a predetermined correct answer data;

a score transmitter which transmits score data including the marking result derived by the marking unit to the user terminal; and an achievement data renewal unit which adds achievement data representing the achievement derived by the marking unit to the achievement storage unit in order to store the achievement data in the achievement storage unit.

The test generator may generate test data representing a test having contents which are classified into various fields.

The achievement storage unit may store achievement data including correct answer percentages for the respective fields.

The target determiner may determine a target score which corresponds to the test data generated by the test generator by deriving predetermined expected scores for the respective fields included in the test data in accordance with the respective correct answer percentages stored in the achievement storage unit, and by adding up all the expected scores.

To accomplish the above object, an education support system according to a sixth aspect of the present invention comprises a user terminal and a support server which are connected with each other via a predetermined network, wherein:

the support server comprises:

test generation means for generating test data representing a test that a user should take;

achievement storage means for storing achievement data representing the user's past achievements;

target determining means for determining a target score which corresponds to the test data generated by the test generation means in accordance with the achievement data stored in the achievement storage means; and test transmitting means for transmitting target data including the target score determined by the target determining means together with the test data generated by the test generation means to the user terminal, the user terminal comprises:

test reception means for receiving the target data and the test data transmitted from the test transmitting means;

display means for displaying the content of the test that the user should take together with the target score for which the user should aim in accordance with the target data and the test data received by the test reception means; and answer acquiring means for acquiring the content of an answer to the test displayed on the display means.

According to this invention, in the support server, the test generation means generates test data representing a test that a user should take in accordance with information stored in, for example, a predetermined test management database. The achievement storage means comprises, for example, an achievement management database or the like, and stores achievement data representing the user's past achievements. The target determining means determines a target score which corresponds to the test data generated by the test generation means in accordance with the achievement data stored in the achievement management database. The test transmitting means transmits target data including the target score determined by the target determining means together with the test data generated by the test generation means to the user terminal. On the other hand, in the user terminal, the test reception means receives the target data and the test data transmitted from the test transmitting means. The display means displays the content of the test that the user should take together with the target score for which the user should aim in accordance with the target data and the test data received by the test reception means. Then, the answer acquiring means acquires the content of an answer to the test displayed on the display means. As described, a user can take a class when it is convenient for the user using this user terminal which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

To accomplish the above object, a target presentation method according to a seventh aspect of the present invention is a method used in an education support system which comprises a user terminal and a support server which are connected with each other via a predetermined network, wherein:

the support server: generates test data representing a test that a user should take; determines a target score which corresponds to the generated test data in accordance with achievement data representing the user's past achievements; and transmits target data including the determined target score together with the generated test data to the user terminal, the user terminal: receives the target data and the test data transmitted from the support server; and displays the content of the test that the user should take together with the target score for which the user should aim on a predetermined display unit in accordance with the received target data and test data.

According to this invention, the support server generates test data representing a test that a user should take in accordance with information stored in, for example, a predetermined test management database, determines a target score which corresponds to the generated test data in accordance with achievement data representing the user's past achievement, and transmits target data including the determined target score together with the generated test data to the user terminal. On the other hand, the user terminal receives the target data and the test data transmitted from the support server, and displays the content of the test that the user should take together with the target score for which the user should aim on a predetermined display unit in accordance with the received target data and test data. As described, a user can take a class when it is convenient for the user using this user terminal which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

To accomplish the above object, a target presentation method according to an eighth aspect of the present invention is a method used in an education support system which comprises a user terminal and a support server which are connected with each other via a predetermined network, the method comprising:

a test generation step of generating test data representing a test that a user should take in the support server;

a target determining step of determining a target score which corresponds to the test data generated in the test generation step in accordance with achievement data representing the user's past achievements;

a test transmitting step of transmitting target data including the target score determined in the target determining step together with the test data generated in the test generation step to the user terminal;

a test reception step of receiving in the user terminal, the target data and the test data transmitted in the test transmitting step; and a display step of displaying the content of the test that the user should take together with the target score for which the user should aim on a predetermined display unit in accordance with the target data and the test data received in the test reception step.

According to this invention, in the support server, the test generation step generates test data representing a test that a user should take in accordance with information stored in, for example, a predetermined test management database. The target determining step determines a target score which corresponds to the test data generated in the test generation step in accordance with achievement data representing the user's past achievements. The test transmitting step transmits target data including the target score determined in the target determining step together with the test data generated in the test generation step to the user terminal. On the other hand, in the user terminal, the test reception step receives the target data and the test data transmitted in the test transmitting step. The display step displays the content of the test that the user should take together with the target score for which the user should aim on a predetermined display unit in accordance with the target data and the test data received in the test reception step. As described, a user can take a class when it is convenient for the user using this user terminal which is connected to a network. Since a target score is presented when a a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class. As a result, it is possible to appropriately improve a user's motivation to take a class while also reducing the burden of taking the class imposed on the user.

In the test generation step, test data representing a test having contents classified into various fields may be generated.

In the target determining step, a target score which corresponds to the test data generated in the test generation step may be determined by deriving expected scores for the respective fields included in the test data in accordance with achievement data representing the user's past achievements field by field, and by adding up all the expected scores.

To accomplish the above object, a recording medium according to a ninth aspect of the present invention is a computer-readable recording medium which stores a program for controlling a computer to execute a target presentation method, the target presentation method comprising:

a test generation step of generating test data representing a test that a user should take in accordance with achievement data representing the user's past achievements;

a target determining step of determining a target score corresponding to the test data generated in the test generation step; and a test transmitting step of transmitting target data including the target score determined in the target determining step together with the test data generated in the test generation step to an objective user terminal via a predetermined network.

To accomplish the above object, a data signal according to a tenth aspect of the present invention is a data signal embedded in a carrier wave, and representing an instruction sequence for controlling a computer to execute a target presentation method, the target presentation method comprising:

a test generation step of generating test data representing a test that a user should take in accordance with achievement data representing the user's past achievements;

a target determining step of determining a target score corresponding to the test data generated in the test generation step; and a test transmitting step of transmitting target data including the target score determined in the target determining step together with the test data generated in the test generation step to an objective user terminal via a predetermined network.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

The education support system according to an embodiment of the present invention will now be explained below with reference to the accompanying drawings. This education support system is used to improve the understandings of products of salespersons (sales managers) who belong to, for example, a company selling office apparati.

Figure 1:
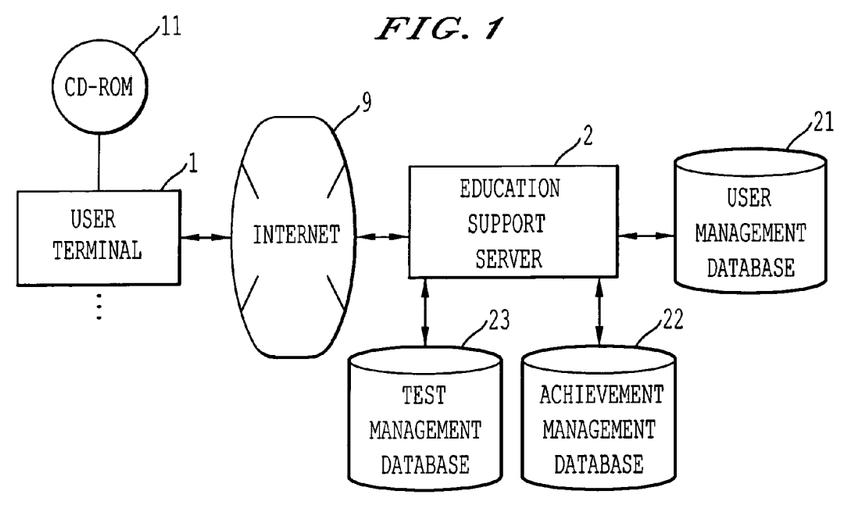
FIG. 1 is a block diagram showing an example of a structure of an education support system according to an embodiment of the present invention.

FIG. 1 is a block diagram showing an example of the structure of the education support system which is applied to this embodiment of the present invention. As shown in FIG. 1, the education support system comprises: a user terminal 1, a CD-ROM 11, an education support server 2, a user management database 21, an achievement management database 22, and a test management database 23. The user terminal 1 and the education support server 2 are connected with each other via the Internet 9.

The user terminal 1 is constituted by a personal computer or the like, and comprises: a display unit, a keyboard and a mouse, a communication control unit, and a driver. The display unit displays predetermined information. The keyboard and mouse are for inputting predetermined instruction information. The communication control unit sends data to, and receives data from the education support server 2 via the Internet 9. The driver reads information stored on the CD-ROM 11.

The CD-ROM 11 to be read by the user terminal 1 stores information such as monthly new product information (a monthly report), an address (the URL (Uniform Resource Locator) of a login screen) of the education support server 2, and the like. The CD-ROM 11 is supplied to a company selling office apparati from, for example, a maker of office apparati.

The user terminal 1 can execute predetermined software for browsing (a Web browser or the like), can display a homepage (a Web page) of the education support server 2 and the like in accordance with a user's operation, and can send predetermined information to the education support server 2.

The education support server 2 comprises a predetermined Web server and the like, and generates, for example, HTML (Hyper Text Markup Language) data, image data and the like using the user management database 21, the achievement management database 22, and the test management database 23. The education support server 2 extracts necessary data from the test management database 23 and the like using a CGI (Common Gateway Interface), and generates HTML data and the like. The education support server 2 sends the generated HTML data and the like to the user terminal 1 via the Internet 9.

More specifically, the education support server 2 certifies a user of the user terminal 1 using the user management database 21, and generates a predetermined test using the test management database 23. When generating a test, the education support server 2 obtains the user's past achievements (scores of past tests, a percentage of correct answers per field and the like) using the achievement management server 22, and derives a target score for the user who is to answer the generated test.

Then, the education support server 2 sends the test (the HTML data and the like) including the derived target score to the user terminal 1 via the Internet 9.

When receiving answer data from the user terminal 1 after the user solves questions on the test, the education support server 2 judges whether answers included in the answer data are correct or wrong, using the test management database 23. In accordance with the judgement, the education support server 2 generates a marking result including a score, and sends the generated marking result together with correct answer data to the user terminal 1.

Further, the education support server 2 adds achievement data (the score, the percentage of correct answers per field, and the like) obtained in the judgement process to the achievement management database 22, and stores the achievement data therein.

The user management database 21 stores predetermined data for managing a user.

Figure 2:
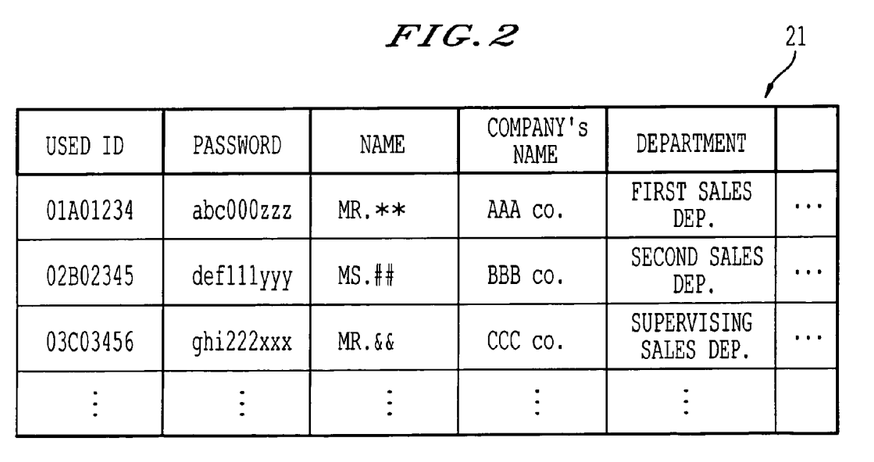
FIG. 2 is a schematic diagram showing an example of data stored in a user management database which is used by an education support server.

Specifically, the user management database 21 stores data including a user ID for specifying a user, a password for judging validity of the user, a name of the user, a name of a company the user belongs to, the section or department the user belongs to, and the like, as shown in FIG. 2.

The achievement management database 22 stores achievement data representing achievements of past tests of each user.

Figure 3:
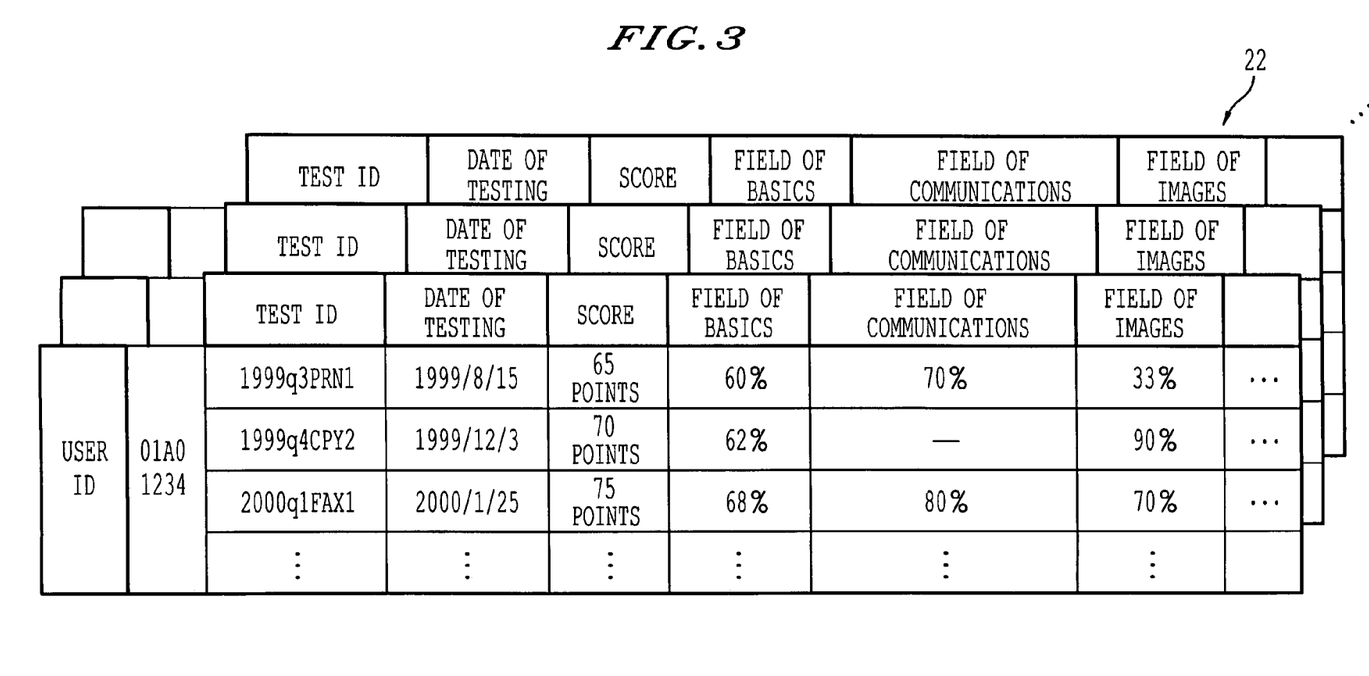
FIG. 3 is a schematic diagram showing an example of data stored in an achievement management database which is used by the education support server.

Specifically, the achievement management database 22 stores data for each user ID including a test ID for specifying a test, a date of testing on which questions in a test are solved, a score, a correct answer percentage per field (a field of basics, a field of communications, a field of images, and the like), and the like, as shown in FIG. 3.

The test management database 23 stores data including: questions (fields) which constitute a test, response choices, and correct answers to the questions.

Figure 4:
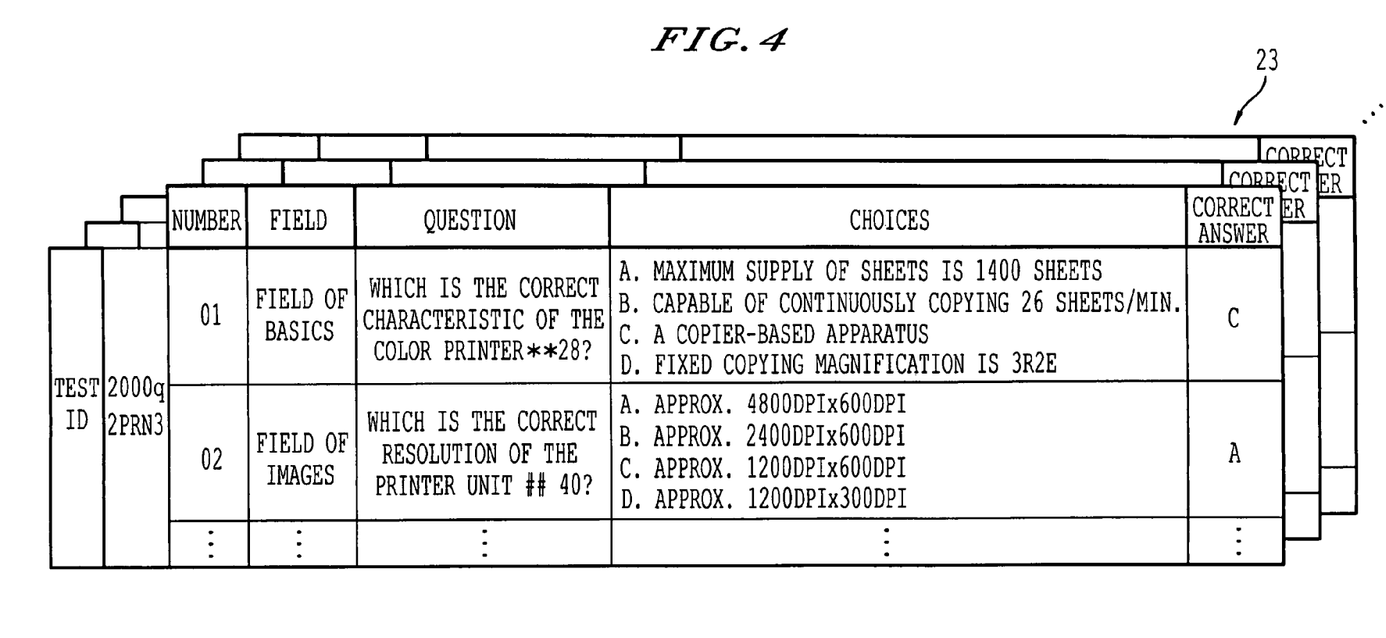
FIG. 4 is a schematic diagram showing an example of data stored in a test management database which is used by the education support server.

Specifically, the test management database 23 stores data including fields to which questions belong, questions, response choices, correct answers to the questions, and the like for each test ID, as shown in FIG. 4.

Figure 5:
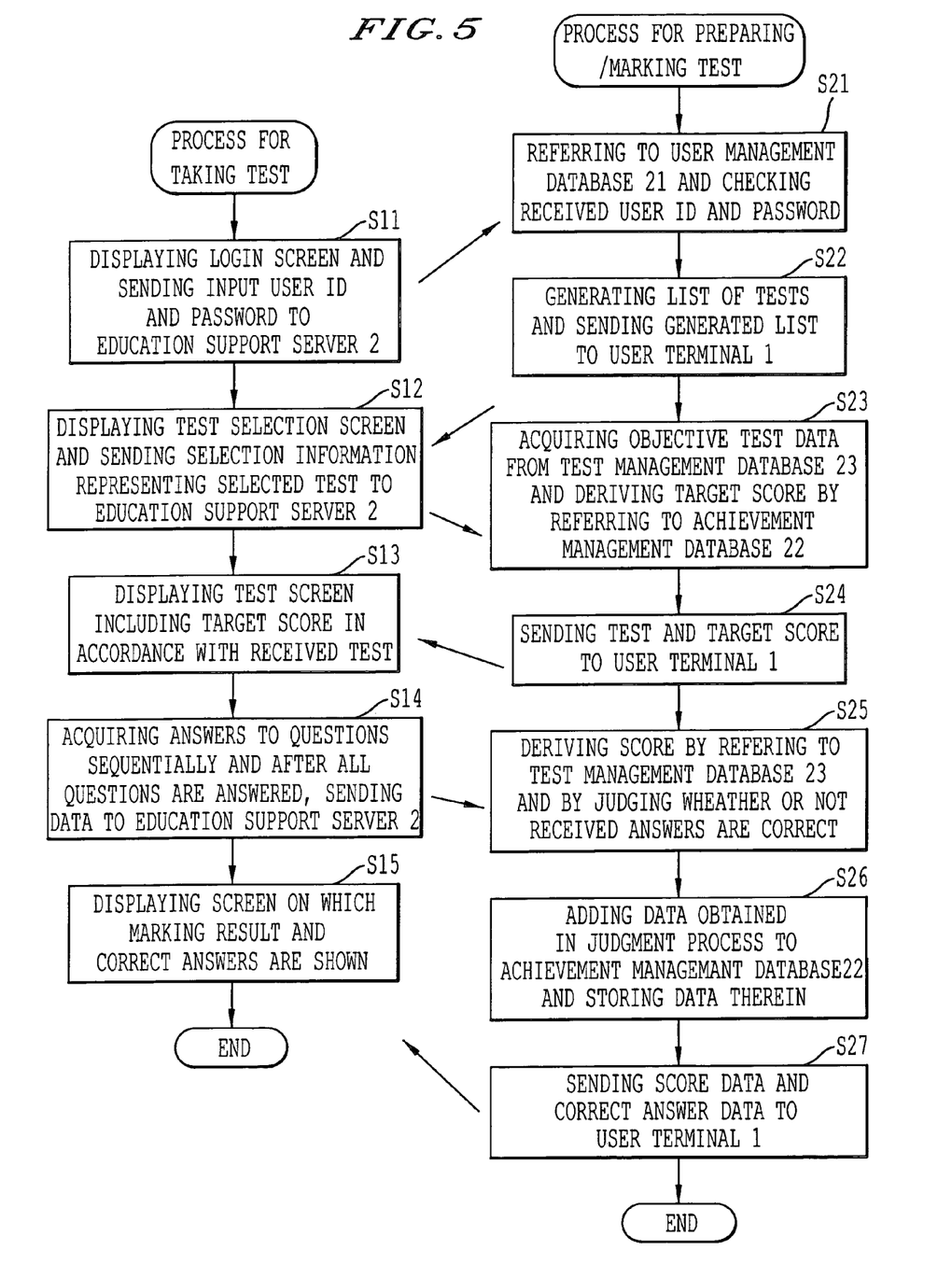
FIG. 5 is a flowchart for explaining the process for taking a test, and the process for preparing/marking a test according to an embodiment of the present invention.

An operation of the education support system according to this embodiment will now be explained below with reference to FIG. 5. FIG. 5 is a flowchart for explaining the process for taking a test performed by the user terminal 1, and the process for preparing/marking a test performed by the education support server 2.

The process for taking a test, and the process for preparing/marking a test shown in FIG. 5 are to be started when a user starts a predetermined Web browser in order to connect the user terminal 1 and the education support server 2, after the user sets the CD-ROM 11 in the user terminal 1 and studies contents stored in the CD-ROM 11 such as the monthly new product information and the like. The user terminal 1 is connected to the education support server 2 via the Internet 9 by selecting the address (the URL of the login screen) of the education support server 2 stored in the CD-ROM 11, or by directly inputting the address of the education support server 2.

The user terminal 1 displays the login screen, and sends a user ID and a password input by a user to the education support server 2 (step S11).

Figure 6A:
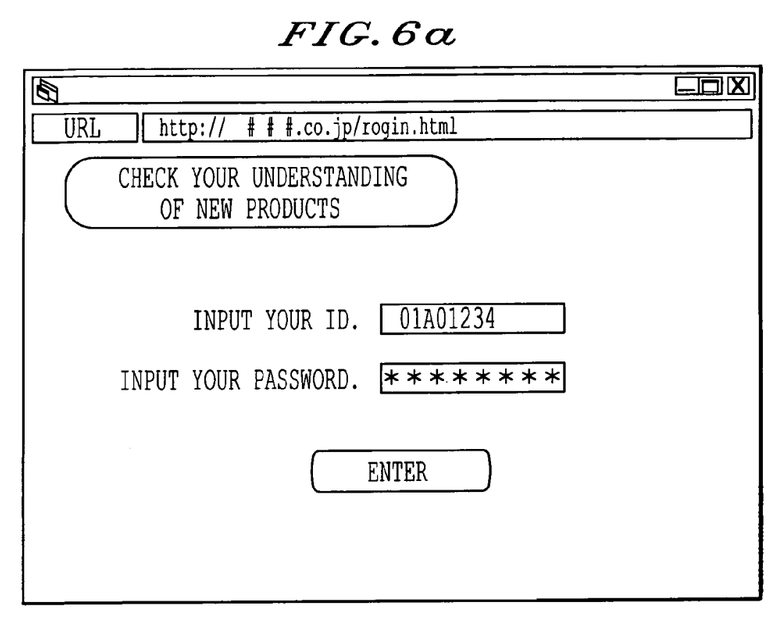
FIG. 6A is a schematic diagram showing an example of a login screen displayed on a user terminal.

That is, the user terminal 1 displays the login screen shown in FIG. 6A on the display unit, according to HTML data and the like which the user terminal 1 acquires by accessing the address of the education support server 2. When acquiring a user ID and a password input by a user using the keyboard and the like, the user terminal 1 sends the acquired user ID and password to the education support server 2 via the Internet 9.

In FIG. 5, when receiving the user ID and password sent from the user terminal 1, the education support server 2 refers to the user management database 21, and checks the received user ID and password (step S21). At this time, the education support server 2 certifies the user who operates the user terminal 1 in a case where the received user ID is stored in the user management database 21, and the password corresponds to the stored password, and then proceeds to the following steps. The education support server 2 sends a predetermined error message (HTML data or the like) to the user terminal 1 in a case where it fails to certify the user, and stops proceeding to the following steps.

The education support server 2 generates a list of tests using the test management database 23 and the like, and sends the generated list of tests (HTML data and the like) to the user terminal 1 (step S22).

When receiving the list of tests sent from the education support server 2, the user terminal 1 displays a test selection screen, and sends selection information indicative of a test selected by the user to the education support server 2 (step S12).

Figure 6B:
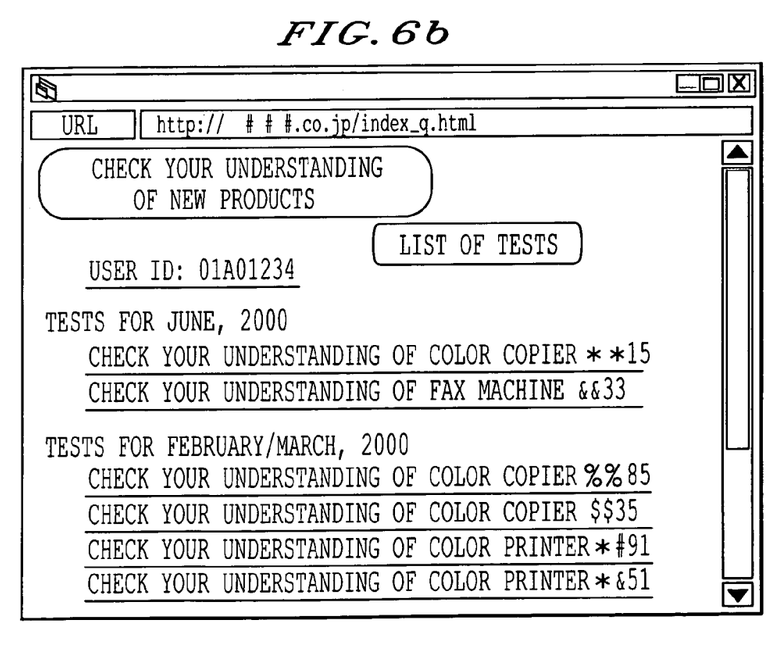
FIG. 6B is a schematic diagram showing an example of a test selection screen displayed on the user terminal.

That is, the user terminal 1 displays a test selection screen shown in FIG. 6B on the display unit, according to the received list of tests. When the user selects any of the tests ("check your understanding of . . . " in FIG. 6B) using the mouse and the like, the user terminal 1 sends selection information (the test ID and the like) for specifying the selected test to the education support server 2.

In FIG. 5, when receiving the selection information, the education support server 2 acquires objective test data (questions, response choices, and the like) from the test management database 23, and derives a target score for which the user should aim by referring to the achievement management database 22 (step S23).

That is, the education support server 2 acquires objective test data specified by the selection information (the test ID and the like) from the test management database 23, and generates the test selected by the user. Then, the education support server 2 acquires the user's past achievements by referring to the achievement management database 22, and derives a target score (an expected score) for the user who is to solve questions of the generated test.

The education support server 2 derives the expected score in the manner described below.

The education support server 2 sums up the user's past achievements by referring to the achievement management database 22, and derives an expected value of the correct answer percentage per field (an average value of the past correct answer percentages, a correct answer percentage for the presently generated test with alterations of the past correct answer percentages taken into account, or the like). The education support server 2 classifies questions included in the generated test into predetermined fields, and afterwards, derives the target score for each field which is expected by doing some calculations such as multiplying the points given to questions classified into each field by the expected value of each field, and the like.

The education support server 2 sends the test and the target score (HTML data and the like) to the user terminal 1 (step S24).

When receiving the test and the like sent from the education support server 2, the user terminal 1 displays a test screen which includes the target score, and on which the user takes the test (step S13).

Figure 7A:
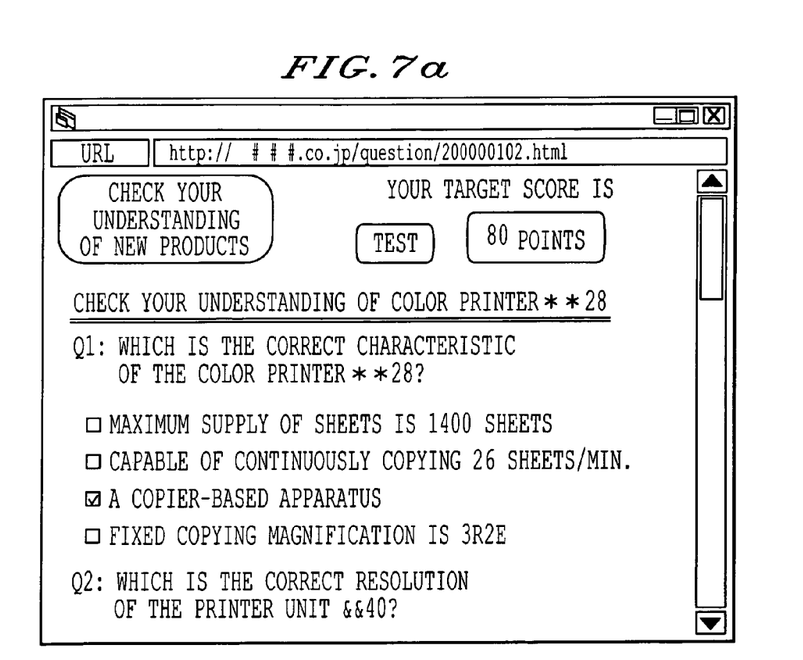
FIG. 7A is a schematic diagram showing an example of a test screen displayed on the user terminal.

That is, the user terminal 1 displays a test screen shown in FIG. 7A on the display unit, according to the received test and target score. The target score (shown as "80 points" in FIG. 7A) and contents of the test are displayed at predetermined positions on this test screen. A check box is provided to each response choice of each question on the test screen, and a checkmark is to be indicated to a response choice (check box) which is selected by the user using the mouse and the like.

In FIG. 5, answers to the questions (checkmarks to the response choices) are sequentially input to the user terminal 1 by the user via the mouse and the like. After all the questions are answered, the user terminal 1 sends answer data which represent the answers to the questions to the education support server 2 (step S14).

When receiving the answer data, the education support server 2 refers to the test management database 23, judges whether or not the answers represented by the answer data are correct, and derives the user's score (step S25).

The education support server 2 adds achievement data (the score, the correct answer percentage per field, and the like) obtained in the judgement process to the achievement management database 22, and stores the achievement data therein (step S26). That is, the education support server 2 adds the achievement data representing the achievement of this test to the achievement management database 22 in order to take this achievement into consideration when deriving the target score for the next test.

The education support server 2 sends score data and correct answer data (HTML data and the like) to the user terminal 1 (step S27). That is, the education support server 2 extracts the correct answer data from the test management database 23, and sends the correct answer data together with the score data representing the score derived in step S25 to the user terminal 1.

When receiving the score data and the correct answer data, the user terminal 1 displays a screen on which a marking result and correct answers are shown (step S15).

Figure 7B:
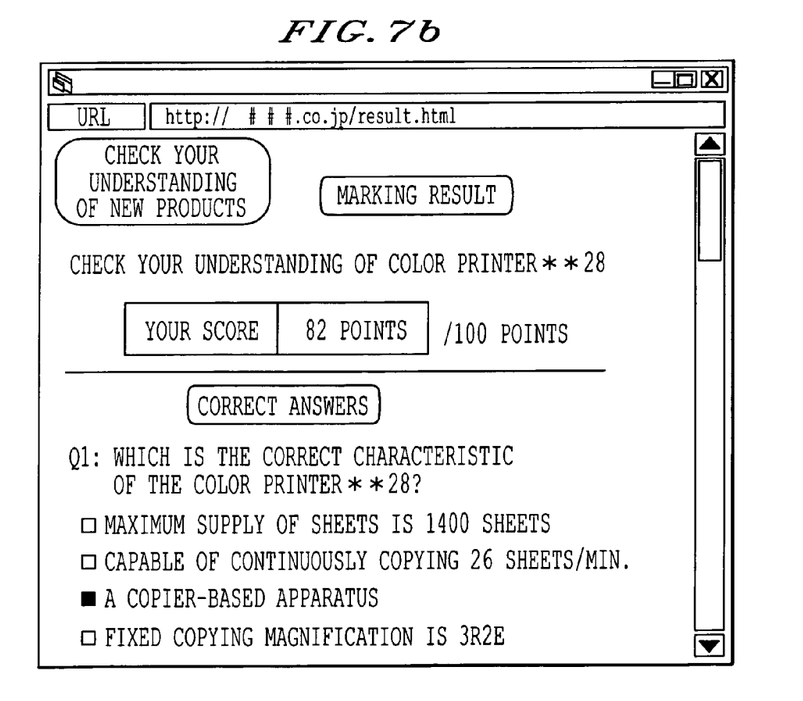
FIG. 7B is a schematic diagram showing an example of a screen on which a marking result and correct answers are shown which is displayed on the user terminal.

That is, the user terminal 1 displays a screen shown in FIG. 7B on which a marking result and correct answers are shown on the display unit. At this time, the aforementioned target score may also be displayed beside the score (the score the user achieves) as the marking result. A predetermined message (for example, "Your score exceeds the target score", "You did a good job.", etc.) may also be displayed based on the relation between the score and the target score.

As explained so far, a user can take a test (or take a class) when it is convenient for the user because of this user terminal 1 which is connected to a network. Since a target score is presented when a user takes a class, the user will not solve questions aimlessly, but will solve questions while keeping the target score in mind. And this target score is appropriate for the user because it is derived based on the user's past achievements. Therefore, the user can aim for attaining or exceeding this appropriately presented target score, and can be highly motivated to take the class.

As a result, it is possible to appropriately improve a user's motivation to take a class while also reducing the burden of taking the class imposed on the user.

In the above embodiment, the education support server 2 derives a target score, and the user terminal 1 displays the target score together with a test. However, data used as a target is not limited to a target score, but can be freely set. For example, the education support server 2 may derive the target correct answer percentage or the like instead of a target score, and the user terminal 1 may display the target correct answer percentage or the like together with a test.

In the above embodiment, there is no time limit set for a user to solve questions. Thus, a user can spend as much time as he/she needs to solve questions. However, a time limit may be set for solving questions after a test is displayed on the user terminal 1.

For example, at the instant of displaying the test screen including the target score in step S13 in the process for taking a test, the user terminal 1 starts counting a preset time limit. And in step S14, even though all the questions have not been solved when the time limit passed, the user terminal 1 automatically sends answer data representing the answers to the solved questions to the education support server 2.

In this case, a same time limit may be set to a number of users, and those users may take the same test under same conditions.

In the above embodiment, the explanation has been given to a case where the target score, the test, and the like are displayed for a user who is to take the test using the user terminal 1. However, a superior who supervises a user may use the user terminal 1 to browse the user's achievements and the like.

For example, the superior accesses the education support server 2 using the user terminal 1, and checks via the Internet 9, scores, dates of testing (dates of taking a class), and the like for each user, or for each group in a case where groups are formed. In this case, there is no need of summing up the scores, reporting the scores to the superior, and the like that sales promotion managers or the like have conventionally done.

In the above embodiment, after a user takes a test, the marking result and the correct answers are displayed on the user terminal 1. Other than those marking result and correct answers, a link to a homepage in which the product which is questioned in the test is described in detail may also be displayed, so that the user can easily browse the homepage of the product.

Further, in accordance with a user's achievement, predetermined information for the user to overcome his/her weak field may be displayed on the user terminal 1.

In the above embodiment, the explanation has been given to a case where the user terminal 1 and the education support server 2 are connected with each other via the Internet 9. However, a network to connect the user terminal 1 and the education support server 2 may be freely chosen. For example, a LAN or the like may connect the user terminal 1 and the education support server 2.

And the system according to the present invention can be realized by an ordinary computer. For example, a program and data for controlling a computer to execute the above-described process may be recorded in a recording medium (an FD, a CD-ROM, a DVD, and the like), and distributed. By installing the program and data to a computer and executing the program and data under the control of OS, the system of the present invention can be realized. The program and data may be stored on a disk device or the like included in a server apparati on the Internet, and embedded in a carrier wave to be downloaded in a computer.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be within the scope of the present invention.

What is claimed is:

1. An education support system comprising a user terminal and a support server which are connected with each other via a predetermined network, wherein:
    said support server comprises:
    a test generator which generates test data representing a test that a user should take;
    an achievement storage unit which stores achievement data including a correct answer percentage of each classified field of tests answered by the user in the past;
    a target setter which sets a predetermined target value indicating a target score which corresponds to the test data as a whole generated by said test generator by deriving an expected score of each field in the test in accordance with changes in the correct answer percentage of each field included in the achievement data stored in said achievement storage unit;
    a test sender which sends target data including the target value set by said target setter together with the test data generated by said test generator to said user terminal;
    an answer reception unit which receives the answer data transmitted from said answer transmitter;
    a marking unit which derives a marking result and an achievement by judging whether the answer represented by the answer data which said answer reception unit receives is correct in accordance with a predetermined correct answer data; and
    an achievement data renewal unit which adds achievement data representing the achievement derived by said marking unit to said achievement storage unit in order to store the achievement data in said achievement data storage unit;
    said user terminal comprises:
    a test reception unit which receives the target data and the test data sent by said test sender;
    a display unit which displays a content of the test that the user should take together with the target value of correct answers at which the user should aim in accordance with the target data and the test data received by said test reception unit;
    an answer acquiring unit which acquires the content of an answer to the test displayed on said display unit; and
    an answer transmitter which transmits answer data which represent the content of the answer acquired by said answer acquiring unit to said support server.

2. The education support system according to claim 1, wherein:
    said support server further comprises
    a score transmitter which transmits score data including the marking result derived by said marking unit to said user terminal.

3. The education support system according to claim 1, wherein:
    said test generator generates test data representing a test having contents which are classified into various fields;
    said achievement storage unit stores achievement data including achievement values for the respective fields; and
    said target setter sets a target value which corresponds to the test data generated by said test generator by deriving predetermined expected values for the respective fields included in the test data in accordance with the respective achievement values stored in said achievement storage unit, and by adding up all the expected values.

4. An education support system comprising a user terminal and a support server which are connected with each other via a predetermined network, wherein:
    said support server comprises:
    test generation means for generating test data representing a test that a user should take;
    achievement storage means for storing achievement data including a correct answer percentage of each classified field of a test answered by the user in the past;
    target setting means for setting a predetermined target value indicating a target score which corresponds to the test data as a whole generated by said test generation means by deriving an expected score of each field in the test in accordance with changes in the correct answer percentage of each field included in the achievement data stored in said achievement storage means;
    test sending means for sending target data including the target value set by said target setting means together with the test data generated by said test generation means to said user terminal,
    answer reception means for receiving the answer data transmitted from said user terminal;
    marking means for deriving a marking result and an achievement by judging whether the answer represented by the answer data which said answer reception means receives is correct in accordance with a predetermined correct answer data; and
    achievement data renewal means for adding achievement data representing the achievement derived by said marking means to said achievement storage means in order to store the achievement data in said achievement storage means;
    said user terminal comprises:
    test reception means for receiving the target data and the test data sent from said test sending means;
    display means for displaying a content of the test that the user should take together with the target value of correct answers at which the user should aim in accordance with the target data and the test data received by said reception means;

answer acquiring means for acquiring the content of an answer to the test displayed on said display means; and answer transmitting means for transmitting answer data which represent the content of the answer acquired by said answer acquiring means to said support server.

5. An education support system comprising a user terminal and a support server which are connected with each other via a predetermined network, wherein:

said support server comprises:

a test generator which generates test data representing a test that a user should take;

an achievement storage unit which stores achievement data including a correct answer percentage of each classified field of a test answered by the user in the past;

a target setter which sets a target score indicating a target score which corresponds to the test data as a whole generated by said test generator by deriving an expected score of each field in the test in accordance with changes in the correct answer percentage of each field included in the achievement data stored in said achievement storage unit;

a test sender which sends target data including the target score set by said target setter together with the test data generated by said test generator to said user terminal;

an answer reception unit which receives the answer data transmitted from said user terminal;

a marking unit which derives a marking result and an achievement by judging whether the answer represented by the answer data which said answer reception unit receives is correct in accordance with a predetermined correct answer data; and an achievement data renewal unit which adds achievement data representing the achievement derived by said marking unit to said achievement storage unit in order to store the achievement data in said achievement data storage unit;

said user terminal comprises:

a test reception unit which receives the target data and the test data sent from said test sender;

a display unit which displays a content of the test that the user should take together with the target score of correct answers at which the user should aim in accordance with the target data and the test data received by said test reception unit;

an answer acquiring unit which acquires a content of an answer to the content of the test displayed on said display unit; and an answer transmitter which transmits answer data which represent the content of the answer acquired by said answer acquiring unit to said support server.

6. The education support system according to claim 5, wherein:

said support server further comprises a score transmitter which transmits score data including the marking result derived by said marking unit to said user terminal.

7. The education support system according to claim 5, wherein:

said test generator generates test data representing a test having contents which are classified into various fields;

said achievement storage unit stores achievement data including correct answer percentages for the respective fields; and said target setter sets a target score which corresponds to the test data generated by said test generator by deriving predetermined expected scores for the respective fields included in the test data in accordance with the respective correct answer percentages stored in said achievement storage unit, and by adding up all the expected scores.

8. A target presentation method in an education support system which comprises a user terminal and a support server which are connected with each other via a predetermined network, said method comprising:

a test generation step of generating test data representing a test that a user should take in said support server;

a target setting step of setting a target score which corresponds to the test data as a whole generated in said test generation step, by deriving an expected score in each field in the test in accordance with changes in the correct answer percentage of each field included in the achievement data being stored in an achievement storage unit and including a correct answer percentage for each classified field of a test answered by the user in the past;

a test sending step of sending target data including the target score set in said target setting step together with the test data generated in said test generation step to said use terminal;

a test reception step of receiving in said user terminal, the target data and the test data set in said test sending step;

a display step of displaying a content of the test that the user should take together with the target score of correct answers at which the user should aim on a predetermined display unit in accordance with the target data and the test data received in said test reception step;

an answer acquiring step of acquiring the content of an answer to the test displayed at said display step;

an answer transmitting step of transmitting answer data which represent the content of the answer acquired by said answer acquiring step to said support server;

an answer reception step of receiving, by said support server, the answer data transmitted at said answer transmitting step;

a marking step of deriving a marking result and an achievement by judging whether the answer represented by the answer data received at said answer reception step is correct in accordance with a predetermined correct answer data; and an achievement data renewal step of adding achievement data representing the achievement derived at said marking step to the achievement storage unit in order to store the achievement data in the achievement data storage unit.

9. The target presentation method according to claim 8, wherein:

in said test generation step, test data representing a test having contents classified into various fields is generated; and in said target setting step, a target score which corresponds to the test data generated in said test generation step is set by deriving expected scores for the respective fields included in the test data in accordance with achievement data representing the user's past achievements field by field, and by adding up all the expected scores.

10. A computer-readable recording medium which stores a program for controlling a computer to execute a target presentation method, said target presentation method comprising:

a test generation step of generating test data representing a test that a user should take;

a target setting step of setting a target score corresponding to the test data as a whole by deriving an expected score in each field in the test generated at said test generation step, in accordance with changes in the correct answer percentage of each field included in the achievement data being stored in an achievement storage unit and including a correct answer percentage for each classified field of a test answered by the user in the past;

a test sending step of sending target data including the target score set in said target setting step together with the test data generated in said test generation step to an objective user terminal via a predetermined network;

an answer reception step of receiving the answer data transmitted from a user terminal;

a marking step of deriving a marking result and an achievement by judging whether the answer represented by the answer data received at said answer reception step is correct in accordance with a predetermined correct answer data; and an achievement data renewal step of adding achievement data representing the achievement derived at said marking step to an achievement storage unit in order to store the achievement data in the achievement data storage unit.

* * * * *